United States Patent [19]
Garland et al.

[11] Patent Number: 6,115,902
[45] Date of Patent: Sep. 12, 2000

[54] METHOD OF MANUFACTURING A RAZOR

[75] Inventors: Colman C. Garland, Orange; Andrew J. Curello, Hamden; Barry C. Johnson, III, Cheshire, all of Conn.

[73] Assignee: Bic Corporation, Milford, Conn.

[21] Appl. No.: 09/028,866

[22] Filed: Feb. 13, 1998

[51] Int. Cl.⁷ .............................. B23P 17/00; B26B 21/00
[52] U.S. Cl. .................................. 29/417; 30/41; 30/50
[58] Field of Search .............................. 29/417, DIG. 46, 29/DIG. 47, 469.5; 30/41, 50; 156/73.2, 73.6

[56] References Cited

U.S. PATENT DOCUMENTS

| | | | |
|---|---|---|---|
| 4,170,821 | 10/1979 | Booth | 30/41 |
| 4,182,582 | 1/1980 | Youval et al. | 405/45 |
| 4,624,051 | 11/1986 | Apprille, Jr. et al. | 30/50 |
| 4,759,207 | 7/1988 | Hawkes | 72/257 |
| 4,778,640 | 10/1988 | Braun et al. | 264/250 |
| 5,070,613 | 12/1991 | Althaus et al. | 30/50 |
| 5,711,076 | 1/1998 | Yin et al. | 30/41 |
| 5,713,131 | 2/1998 | Rogers et al. | 30/41 |
| 5,956,849 | 9/1999 | Chadwick et al. | 30/41 |

OTHER PUBLICATIONS

Barmmer, Bonnie, *Ultrasonic & Microprocessors Team–Up for Efficient Assembly*, Assembly Engineering, Nov. 1987.

*Primary Examiner*—David P. Bryant
*Attorney, Agent, or Firm*—Pennie & Edmonds LLP

[57] ABSTRACT

A method of affixing a shaving aid element to a razor is disclosed, which includes the step of extruding the shaving aid element to form a strand of shaving aid material. The strand is then rolled onto a continuous spool for storage. During assembly, the strand is fed to an ultrasonic welder and cutter for cutting the strand into a predetermined length and for welding the shaving aid element to a razor. The strand may be cold worked to increase it ductility and to alter its shape prior to being cut and welded.

17 Claims, 6 Drawing Sheets

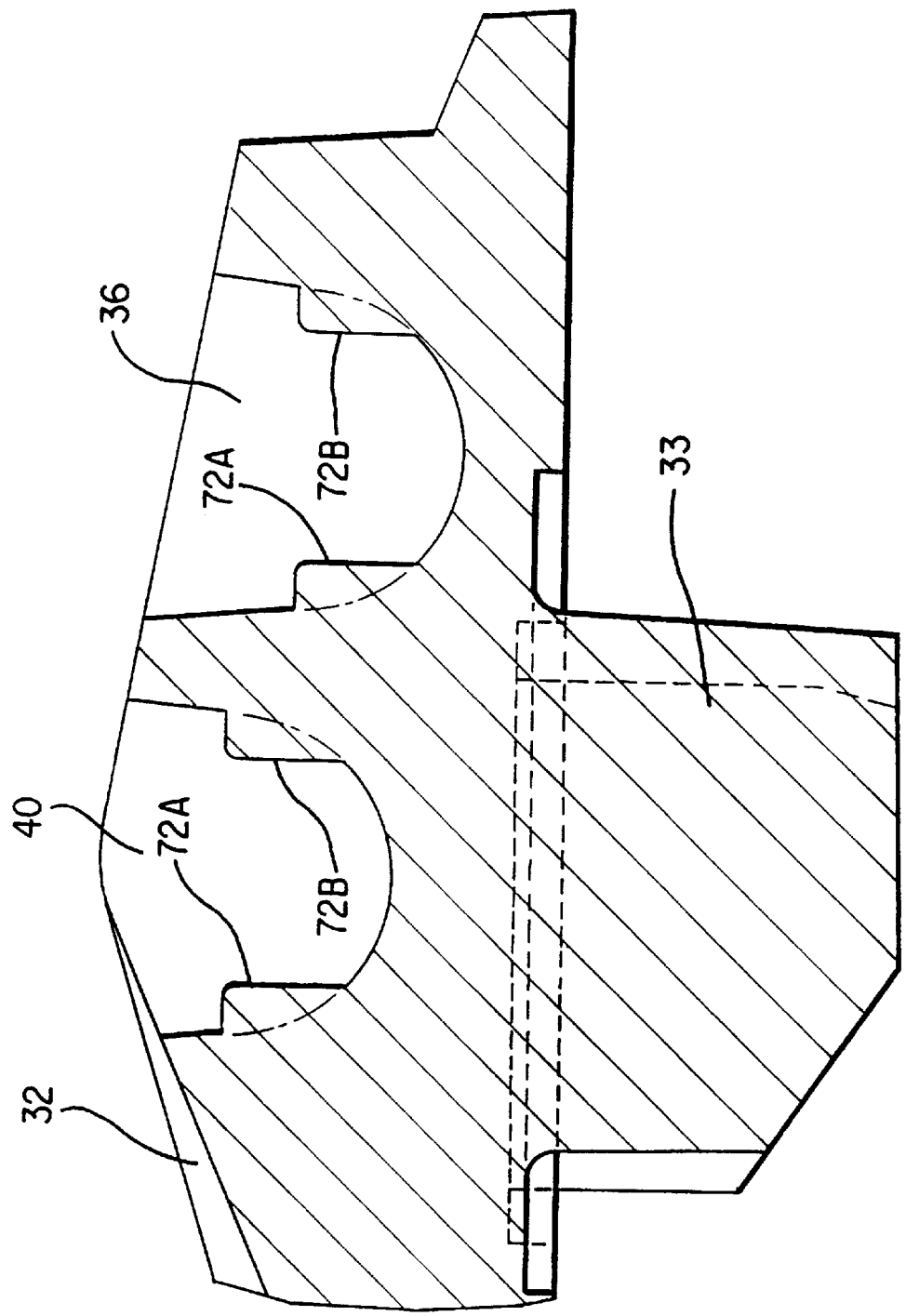

METHOD OF MANUFACTURING A RAZOR

FIELD OF THE INVENTION

The present invention is directed to a method of manufacturing a razor, and more particularly to a method for manufacturing a razor having a shaving aid element.

BACKGROUND OF THE INVENTION

The incorporation of a shaving aid element in a disposable razor is often desirable. U.S. Pat. No. 4,170,821 ("'821 patent") discloses a razor cartridge with a solid water-soluble shaving aid. The shaving aid can be a lubricant, whisker softener, razor cleaner, medicinal agent, aloe vera, vitamin E, lanolin, and other ingredients or any combination of these. A typical composition of a shaving aid element comprises a hydrophilic polymer and other soluble shaving aids such as those listed above being embedded in a matrix of a hydrophobic polymer. Typically, polyethylene oxide is used as the hydrophilic polymer and polystyrene is used as the hydrophobic polymer. Other compositions are also possible.

Regardless of the exact chemical composition used for the shaving aid element, injection molding or extrusion can be used to manufacture shaving aid elements in quantities necessary for mass production. In injection molding, the shaving aid element is co-molded directly in the razor as shown in U.S. Pat. No. 4,778,640. In extrusion, the shaving aid element is extruded in the desired shape and then typically cut to size as shown in U.S. Pat. No. 4,624,051 ("'051 patent"). Furthermore, positioning the pre-cut elements in the proper orientation and position for affixing to the razor complicates the manufacturing process.

Methods for securing the pre-cut shaving aid element to the razor include mechanical means and adhesives. When mechanical means is utilized, the razor is made with an internal cavity and the shaving aid element is inserted into the cavity as illustrated in the '051 patent. A tab or any like member retains the shaving aid element in the cavity. Disadvantages associated with this method include the need to precisely pre-cut the shaving aid element to close tolerances, as well as the added manufacturing expense and time of producing the tabs or like members.

When an adhesive, such as an acrylate adhesive, is used, the shaving aid element and the razor must be properly positioned after the adhesive is applied and clamped together for a period of time to allow a bond to form. Although the curing time can be reduced by the application of energy, such as ultraviolet radiation, this adds another manufacturing step and increases production costs. Furthermore, the ultraviolet radiation may be absorbed or deflected by structural elements on the razor units, thereby preventing uniform curing of the adhesive. In any event, even an accelerated cure time decreases manufacturing efficiency. Other disadvantages with adhesives are the added expense of the adhesive and the difficulties associated with the handling of adhesives.

The application of ultrasonic energy to join plastic components has been utilized in many industries. In ultrasonic welding, a solid-state power supply transforms electrical energy to 20 kHz or 40 kHz mechanical energy. A converter changes this electrical energy into ultrasonic mechanical vibratory energy. A horn transmits the ultrasonic mechanical energy directly to the parts to be assembled. A combination of applied force, surface friction, and intermolecular friction at the mating surface between the parts to be joined elevates the temperature until the melting point of the material is reached. Force is maintained after the vibrations cease and a molecular bond or weld at the interface is produced. A more complete discussion of ultrasonic welding is found in the following publications, which are hereby incorporated by reference: "Ultrasonics & Microprocessors Team-up for Efficient Assembly", *Assembly Engineering*, Nov. 1987, and *Ultrasonics Plastics Assembly*, 1979, published by the Branson Ultrasonics Corporation.

Ultrasonic welding has also been used in the shaving industry. For example, U.S. Pat. No. 5,070,613 describes a razor blade unit with a blade holder secured by a fixation strip ultrasonically welded to a lower portion of the razor blade unit. Further, it is well-known to ultrasonically weld a head portion of a disposable razor to a handle portion. However, ultrasonic welding of a shaving aid element has not been suggested or disclosed in the art.

Thus, there exists a need for a feasible method in which a shaving aid element is ultrasonically welded to a razor.

SUMMARY OF THE INVENTION

It is therefore an object of the present invention to provide a method of manufacturing a razor in which at least one shaving aid element has been ultrasonically welded to the razor.

Another object of the invention is to optimize the manufacturing process of a razor having a shaving aid element affixed thereto.

A further object of the invention is to extrude a shaving aid element in the form of a continuous strand to facilitate storage and eventual affixation to the razor.

It is also an object of the invention to cold work the strand to the desired shape prior to affixing the shaving aid to the razor.

These and other objects of the invention are accomplished by a method for attaching a shaving aid element to a razor comprising the steps of: extruding the shaving aid into a continuous strand, rolling the strand on to a spool, feeding the strand from the spool to a cutter, cutting the strand into predetermined lengths of shaving aid elements; and attaching at least one shaving aid element to a razor. Said method may also include the step of extruding the shaving aid element into a continuous strand having a circular cross-section, and the step of cold working the strand prior to the step of cutting the strand. Additionally, said method may also include the step of ultrasonically welding the shaving aid element to the razor, by directing ultrasonic energy to the side walls of a channel on the razor adapted to receiving the at least one shaving aid element.

BRIEF DESCRIPTION OF THE DRAWINGS

FIG. 6 is a cross sectional view of the razor cover shown in FIG. 4 without the shaving aid elements.

DESCRIPTION OF THE PREFERRED EMBODIMENTS

Figure 1:
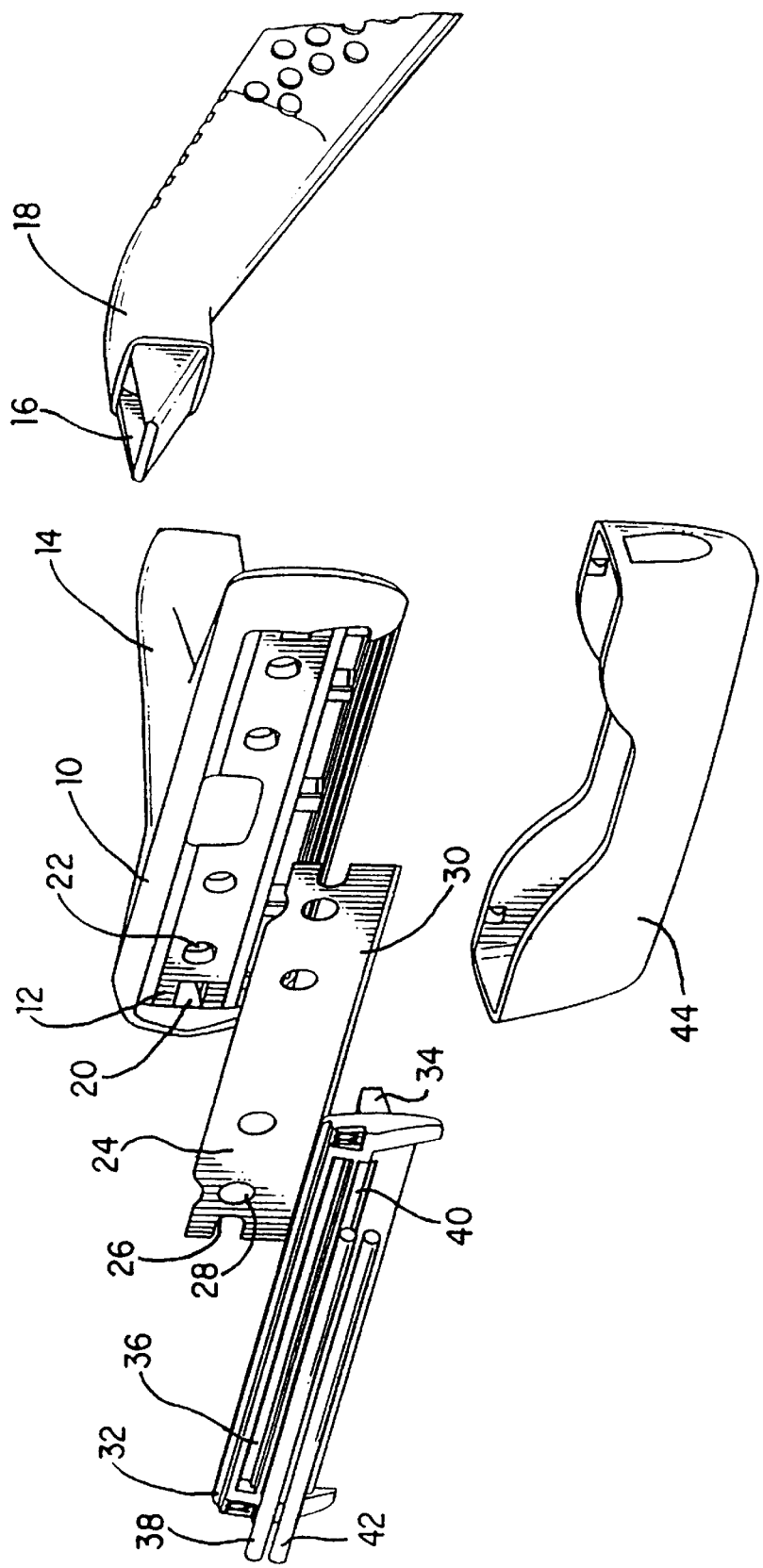
FIG. 1 is an exploded perspective view illustrating a razor with shaving aid elements manufactured according to the present invention.

As shown in FIG. 1, a razor comprises a blade seat 10 with a seating portion 12 and a connecting portion 14. Connecting portion 14 mates with an arm 16 of handle 18, only a portion of which is depicted. Connecting portion 14 and arm 16 are permanently attached to each other using any appropriate method, such as an adhesive or by ultrasonic welding. Thus, the razor shown in FIG. 1 is a disposable razor in which the entire unit is discarded when the blade becomes dulled. The present invention can also be utilized to manufacture a disposable cartridge adapted for coupling to and uncoupling from a reusable razor handle, and thus, the present invention is not limited to any particular type of razor configurations.

Seating portion 12 includes a rectangular opening 20 on each end and a plurality of circular holes 22 disposed therebetween. Seating portion 12 is configured and dimensioned to receive at least one blade 24. Blade 24 has end slots 26 and a plurality of circular holes 28 disposed therebetween. When blade 24 is properly seated in seating portion 12, slots 26 align with openings 20 and holes 22 align with holes 28. Although the razor is shown having only one blade, the method of manufacturing according to the present invention can also be used on disposable razors or cartridges having multiple blades. With the exception of a cutting edge 30, a cover 32 covers all of blade 24. Rivets 33 (shown in FIG. 5) and posts 34 extend from a back side of cover 32. Blade 24 is held by rivets 33 which are inserted into holes 22 on seating portion 12 through holes 28 on blade 24, and by posts 34 which are inserted into rectangular openings 20 through end slots 26. Ends 35 of rivets 33 are compressed to permanently attach cover 32 and blade 24 to blade seat 10.

Cover 32 has an upper channel 36 adapted to receive a first shaving aid element 38 and a lower channel 40 for receiving a second shaving aid element 42. First and second shaving aid elements 38, 42 can be lubricants, whisker softeners, razor cleaners, medicinal agents, aloe vera, vitamin E, lanolin, or any combination of these. It is preferred that each of the shaving aid elements carries a different shaving aid. It is also important to note that the present invention can be used with any number of shaving aid elements. After the razor has been assembled, protector cap 44 covers cutting edge 30 and protects it until use and between uses.

In a preferred embodiment, a shaving aid element is extruded into a continuous strand in a well-known manner and is air-cooled prior to being rolled onto a spool for storage. Methods for extruding shaving aid have been disclosed in the '821 patent and references cited therein, and are hereby incorporated herein by reference. U.S. Pat. No. 4,182,582 also teaches a method of co-extruding different polymers including hydrophilic and hydrophobic materials and is hereby incorporated herein by reference. The '051 patent also discloses that the hydrophobic polymer matrix can make up to 50% or more by volume of the shaving aid element. The hydrophobic polymer can make up from 20% to 80% by volume of the shaving aid element. It is preferred that the matrix makes up about 25%–35% by volume of the shaving aid element and the matrix material is polystyrene. The remaining volume of the shaving aid comprises the various water soluble shaving aid materials. Furthermore, the preferred shape for the extruded shaving aid strand is a circular cross-section, since it is the optimal shape for storing onto a spool. It is also preferred that the environmental factors, such as temperature and humidity, be controlled during the extrusion process to minimize the absorption of water by the hydrophilic polymers contained in the shaving aid.

Figure 2:
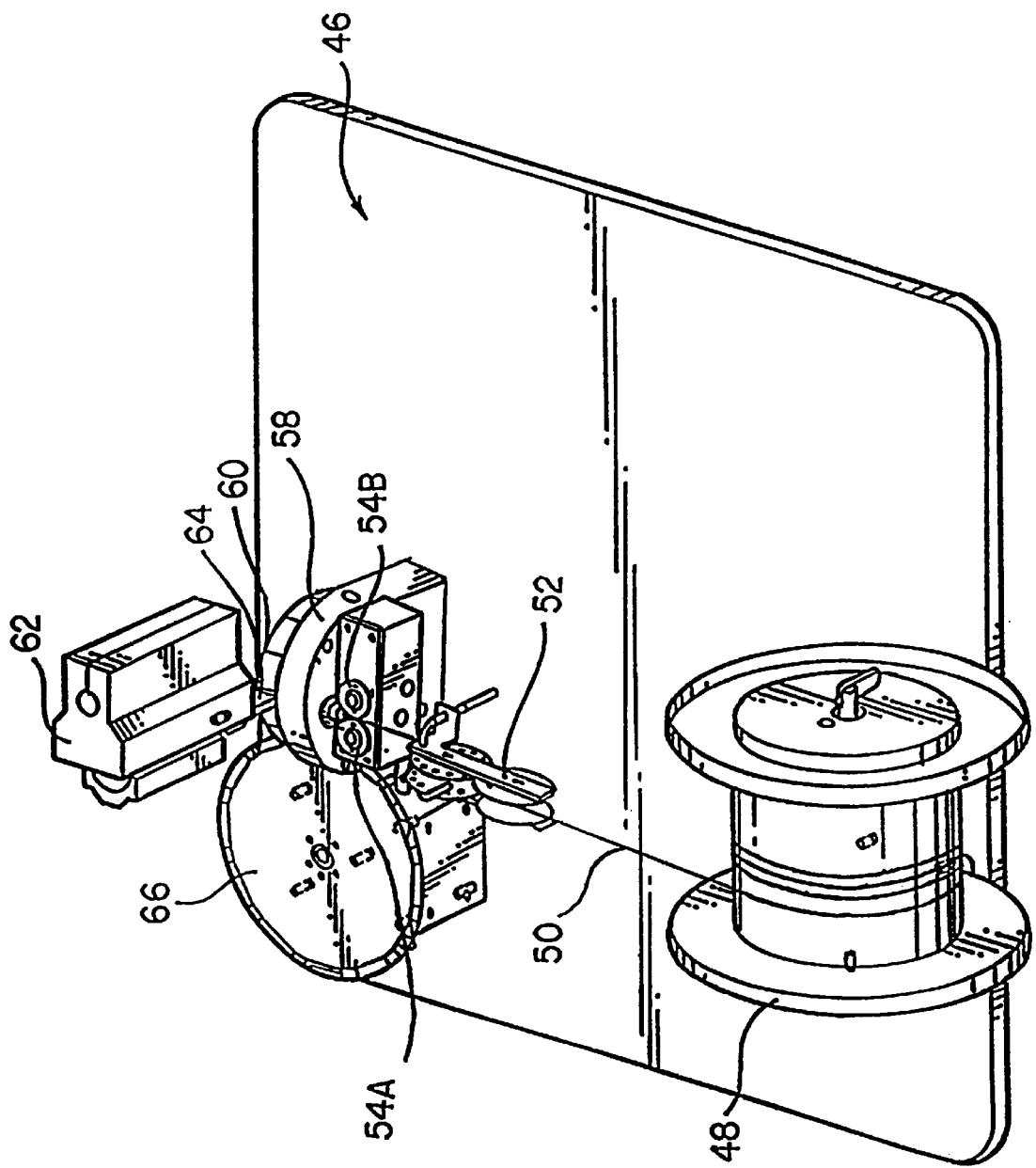
FIG. 2 is a schematic of a manufacturing assembly using the method according to the present invention to produce the razor.

The manner in which the shaving aid elements are attached to the razor is shown in FIG. 2. A manufacturing assembly 46 employs a spool 48 which contains a shaving aid element in the form of a continuous strand 50 as discussed above. Strand 50 is fed from spool 48 through tensioning elements 52 which draw strand 50 taut into left roller 54A and right roller 54B to be cut into the predetermined length and be affixed onto the razor.

Thus in accordance with the present invention, cutting the shaving aid element into premeasured segments for storage and then orientating and positioning the shaving aid elements prior to affixing them to the razor as illustrated in the '051 patent have been eliminated.

Figure 3:
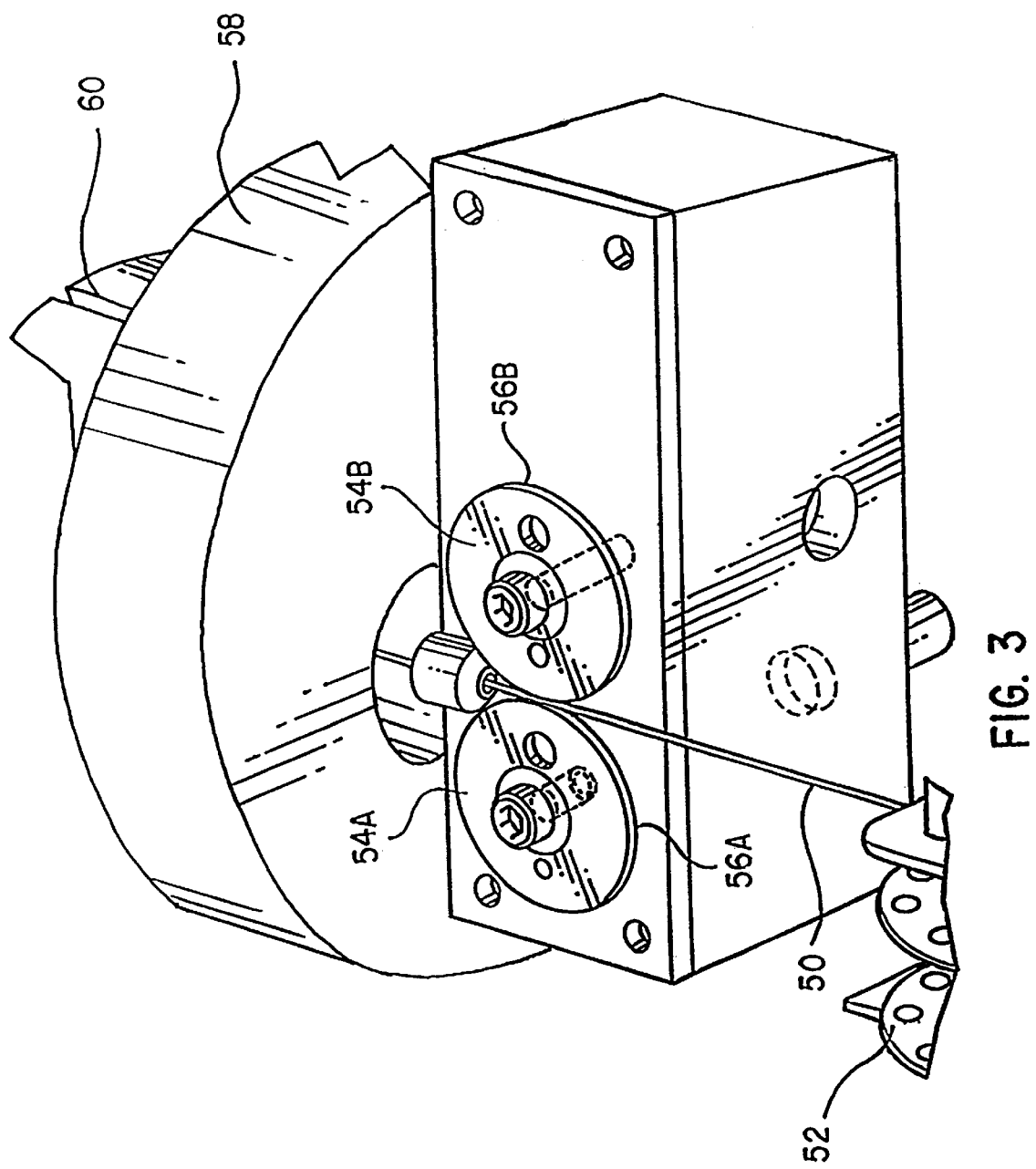
FIG. 3 is an enlarged schematic of a cold working portion of the manufacturing assembly.

Rollers 54A, 54B are adapted to pull strand 50 from spool 48 and feed the shaving aid element from strand 50 to the razor assembly unit. Rollers 54A and 54B may also cold work strand 50 into any desired profile of the shaving aid elements that can be co-rolled including symmetrical cross-sections such as circular, square, rectangular, triangular, and elliptical, and non-symmetrical cross-sections. As best seen in FIG. 3, left and right rollers 54A, 54B have contacting surfaces 56A, 56B, respectively. The degree of cold working and the final profile of the shaving aid elements depend on the geometry and dimension of contacting surfaces 56A, 56B. It is not necessary for contacting surfaces 56A, 56B to be identical. For example, contacting surface 56A can be rectangular and contacting surface 56B can be rounded. It has been observed that cold working also provides strand 50 with increased ductility. The increased ductility of strand 50 provides greater flexibility in the manufacturing process. Alternatively, heat may be added to rollers 54A and 54B to facilitate the process.

Referring to FIGS. 2 and 3, strand 50 is fed into wheel 58 after the cold working step. Wheel 58 has a plurality of fixtures 60. Each fixture 60 is configured and dimensioned to receive one cover 32 and any method of feeding cover 32 into fixture 60 can be used. For example, covers 32 may be fed into fixtures 60 on wheel 58 by a vibrating bowl, such vibrating bowls are available from Moorseed Corp. in Indianapolis, Ind., USA. When a portion of strand 50 has been fed into and aligned with fixture 60, a predetermined length of strand 50 is cut and the shaving aid element is affixed to cover 32 at either upper or lower channel 36, 40.

An ultrasonic welder/cutter 62 cuts strand 50 into a predetermined length of shaving aid element and ultrasonically welds the shaving aid element to the razor. Ultrasonic welder/cutter 62 includes an actuator, which contains a converter, booster, horn, and pneumatic or servo controls. The actuator brings the horn 64 into contact with fixture 60, applies appropriate force during the welding and cutting, and retracts the horn after the weld cycle. After the shaving aid element has been ultrasonically welded to cover 32, cover 32 is transferred to a quality control unit 66 for inspection.

For the sake of simplicity, FIG. 2 and FIG. 3 show the attachment of only one shaving aid element to cover 32. In order to attach a second shaving aid element, a second configuration of a spool, tensioning elements, and rollers would feed a second strand into wheel 58. A second ultrasonic welder/cutter is utilized to cut and weld the second shaving aid element to cover 32.

Figure 4:
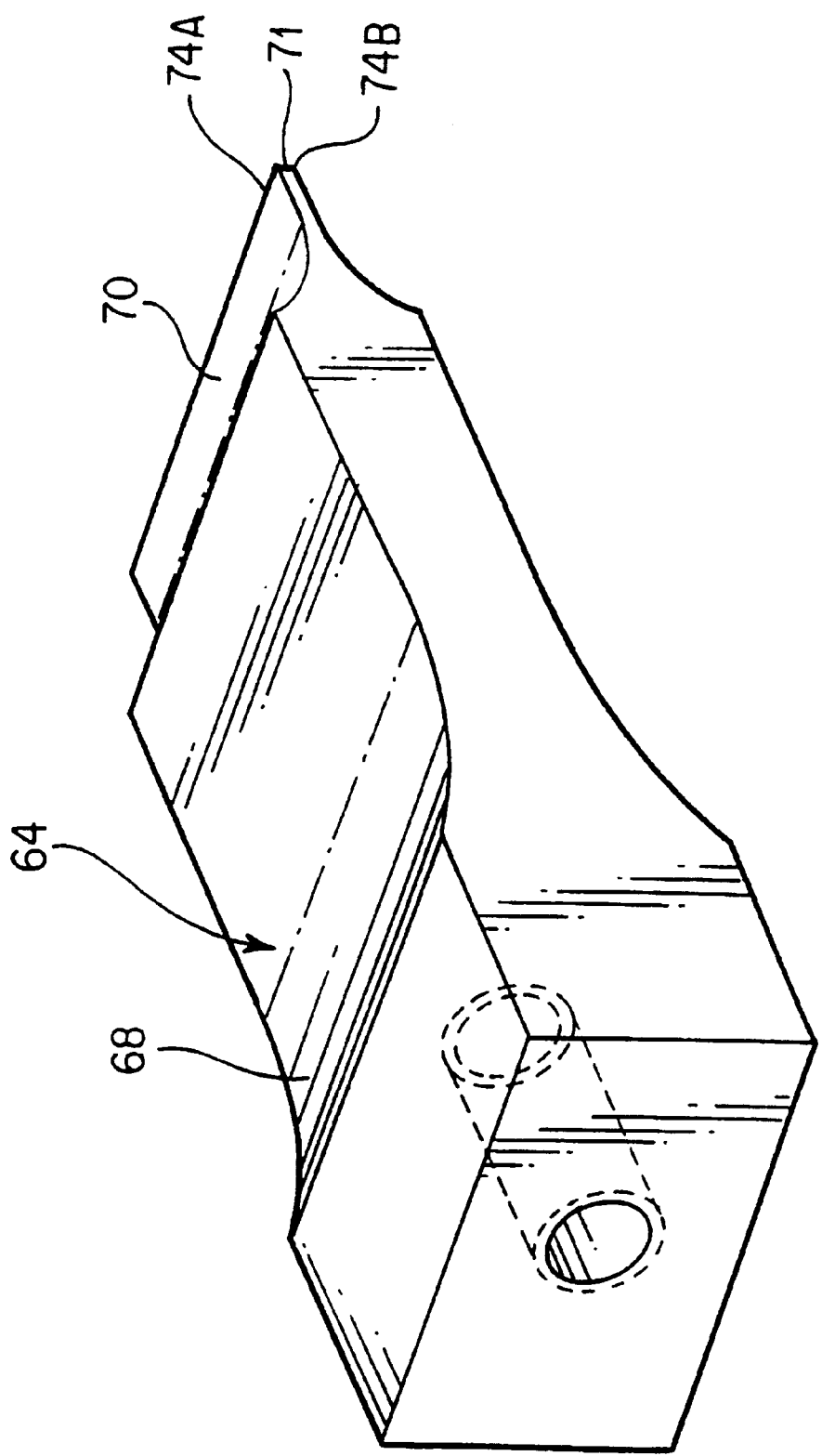
FIG. 4 is an isometric view of a horn of an ultrasonic welder/cutter.
Figure 5:
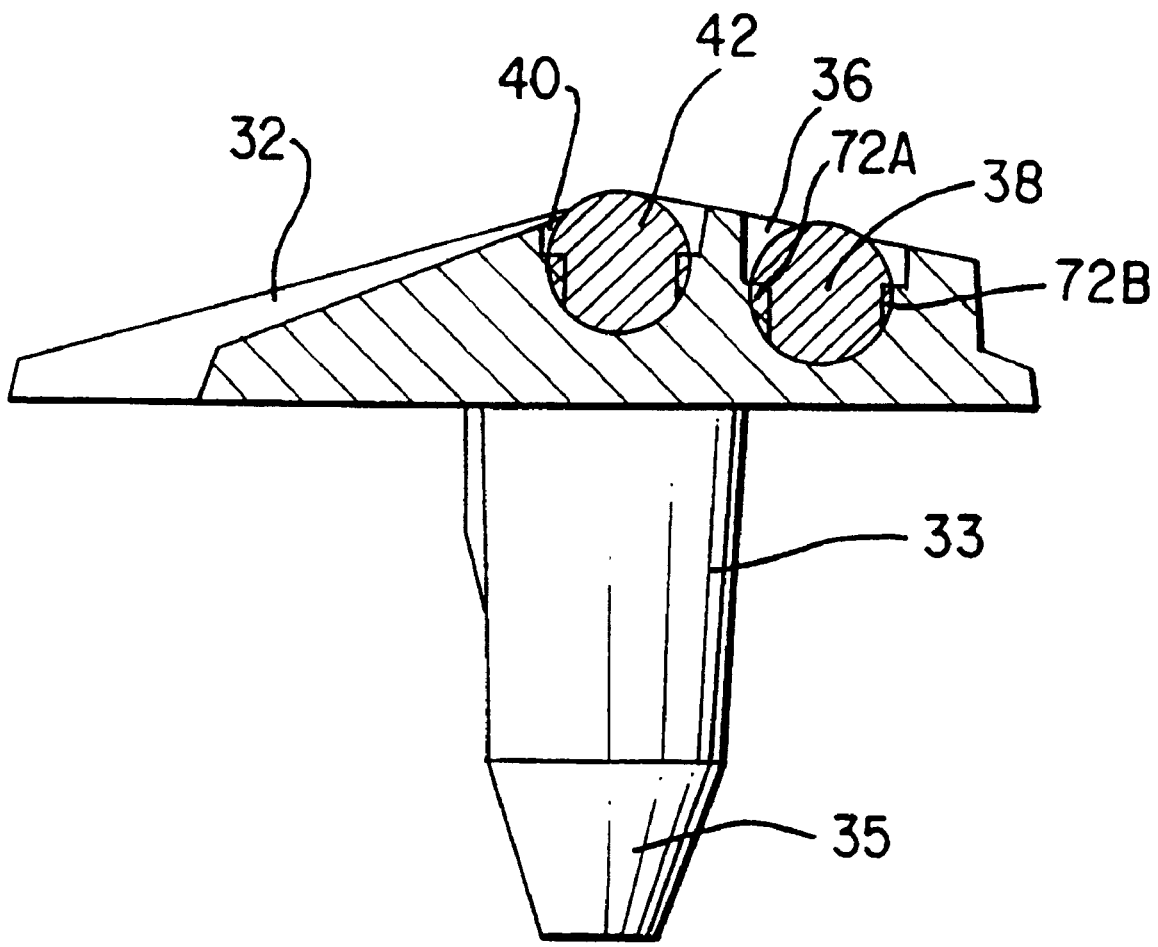
FIG. 5 is a cross sectional view of a razor cover having the shaving aid elements.

In another preferred embodiment of the invention, the ultrasonic energy emanating from horn 64 is directed away from the bottom of channels 36, 40 and toward the side walls of these channels. As shown in FIG. 4, horn 64 has a tapered body 68 which terminates at an energy transmitter 70. The geometry of horn 64 controls the direction of the ultrasonic energy preferably towards side walls 72A and 72B (FIGS. 5 and 6) of channels 36, 40. More specifically, energy transmitter 70 comprises a circular portion 71 configured and dimensioned to fit over shaving aid 38, 42. Circular portion 71 terminates at corners 74A and 74B. The ultrasonic energy emanating from transmitter 70 preferably partially melts a portion of side walls 72A and 72B shown in FIG. 6 to form a weld between the shaving aid and the side walls. As shown in FIG. 5, the shaving aids are shown in an overlapping manner with side walls 72A and 72B. After the ultrasonic energy is applied, the overlapping areas melt together to form two continuous weld lines between each shaving aid and channel 36, 40 to permanently attach the shaving aid to the razor cover.

It is known that a strong ultrasonic weld can be produced if the parts to be joined are made of the same or similar materials. Therefore, if polystyrene is used as the hydrophobic component of shaving aid element 38, 42, it is preferred that cover 32 also be made of polystyrene. However, the method according to the present invention can produce a bond of sufficient strength between dissimilar materials. Thus, a sufficient bond can be established between the shaving aid element 38, 42 and the cover 32, even when these elements are made out of dissimilar materials.

While it is apparent that the illustrative embodiments of the invention herein disclosed fulfil the objectives stated above, it will be appreciated that numerous modifications and other embodiments may be devised by those skilled in the art. Therefore, it will be understood that the appended claims are intended to cover all such modifications and embodiments which come within the spirit and scope of the present invention.

What is claimed is:

1. A method of attaching a shaving aid element to a razor or cartridge comprising the steps of:

extruding said shaving aid into a continuous strand;

rolling said strand on to a spool;

feeding said strand from said spool to a cutter positioned at a razor assembly unit;

cutting said strand into predetermined lengths of shaving aid elements at said razor assembly unit; and attaching at least one shaving aid element to a razor or cartridge at said razor assembly unit.

2. The method of claim 1, wherein said step of extruding said shaving aid element includes the step of extruding said shaving aid element into a continuous strand having a circular cross-section.

3. The method of claim 1, further comprising the step of cold working said strand prior to said step of cutting said strand.

4. The method of claim 1, wherein said step of attaching at least one shaving aid element to said razor further includes the step of ultrasonically welding said shaving aid element to said razor or cartridge.

5. The method of claim 4, wherein said step of ultrasonically welding further includes a step of directing ultrasonic energy to side walls of a channel on said razor or cartridge adapted to receiving said at least one shaving aid element.

6. A method of manufacturing a disposable razor or cartridge with at least one shaving aid element comprising the steps of:

ultrasonically welding said at least one shaving aid element to said razor or cartridge by directing ultrasonic energy to a sidewall in said razor or cartridge adjacent to said at least one shaving aid element so that said at least one shaving aid element and said razor or cartridge are joined by a weld formed between said sidewall and said at least one shaving aid element;

seating at least one razor blade in a blade seat; and affixing said at least one razor blade between said blade seat and a cover.

7. The method of claim 6, further comprising the step of directing ultrasonic energy to sidewalls of at least one channel in said cover sized to receive said at least one shaving aid element so that said at least one shaving aid element and said cover are joined by welds formed between said sidewalls and the at least one shaving aid element.

8. The method of claim 6, further comprising the step of extruding said shaving aid element in a continuous strand.

9. The method of claim 8, further comprising the step of storing said continuous strand on a spool until use.

10. The method of claim 8, further comprising the step of cold working said strand to produce a profile that matches a profile of said at least one channel in said cover.

11. The method of claim 10, further comprising the step of performing said cold working by passing said strand between two rollers.

12. The method of claim 8, further comprising the step of cutting said strand to a predetermined length of said at least one shaving aid element.

13. The method of claim 8, further comprising the step of controlling ambient temperature and humidity to reduce water absorption of said strand.

14. The method of claim 6, wherein said cover is made of polystyrene and said at least one saving aid element contains polystyrene.

15. The method of claim 14, wherein said at least one shaving aid element contains 25%–35% polystyrene.

16. A method of attaching a shaving aid element to a razor or cartridge comprising the steps of:

extruding the shaving aid into a continuous strand having a circular cross-section;

rolling the strand on to a spool;

feeding the strand from the spool to a cutter;

cutting the strand into predetermined lengths of shaving aid elements; and attaching at least one shaving aid element to a razor or cartridge.

17. The method of claim 16, wherein said step of attaching at least one shaving aid element to said razor or cartridge further includes the step of ultrasonically welding said shaving aid element to said razor or cartridge.

* * * * *